United States Patent
Brown et al.

(10) Patent No.: US 8,997,186 B2
(45) Date of Patent: Mar. 31, 2015

(54) SYSTEM AND METHOD FOR ENHANCED CONTROL SYSTEM SECURITY

(71) Applicant: General Electric Company, Schenectady, NY (US)

(72) Inventors: Susan Jean Brown, Salem, VA (US); Richard William Shaw, Jr., Salem, VA (US); Jeffery Martin Emery, Salem, VA (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 13/749,670

(22) Filed: Jan. 24, 2013

(65) Prior Publication Data

US 2014/0208390 A1    Jul. 24, 2014

(51) Int. Cl.
| | |
|---|---|
| *G06F 7/04* | (2006.01) |
| *G05B 11/01* | (2006.01) |
| *G06F 21/30* | (2013.01) |
| *G06F 21/33* | (2013.01) |
| *H04L 29/06* | (2006.01) |
| *H04L 29/08* | (2006.01) |

(52) U.S. Cl.
CPC ............... *G05B 11/01* (2013.01); *G06F 21/30* (2013.01); *G06F 21/33* (2013.01); *H04L 63/102* (2013.01); *H04L 67/12* (2013.01); *H04L 63/0823* (2013.01)
USPC .......................................................... 726/4

(58) Field of Classification Search
CPC ...... G05B 11/01; H04L 67/12; H04L 63/102; G06F 21/33; G06F 21/30
USPC .......................................................... 726/4
See application file for complete search history.

(56) References Cited

U.S. PATENT DOCUMENTS

| | | | |
|---|---|---|---|
| 5,774,652 A | 6/1998 | Smith | |
| 8,121,707 B2 | 2/2012 | Karaffa et al. | |
| 2007/0121501 A1* | 5/2007 | Bryson | ........................ 370/230 |
| 2008/0175388 A1 | 7/2008 | Okabe et al. | |
| 2009/0171479 A1 | 7/2009 | Oosako | |
| 2010/0192208 A1 | 7/2010 | Mattsson | |
| 2010/0281097 A1 | 11/2010 | Mahnke | |
| 2010/0313264 A1 | 12/2010 | Xie et al. | |
| 2011/0035792 A1 | 2/2011 | Leitner | |

FOREIGN PATENT DOCUMENTS

| | | |
|---|---|---|
| EP | 0891611 B1 | 1/1999 |
| WO | 2005069823 A2 | 8/2005 |

OTHER PUBLICATIONS

International Search Report and Written Opinion issued in connection with corresponding PCT Application No. PCT/US2014/010454 on Jul. 1, 2014.
OPC Foundation, "OPC Unified Architecture Specification Part 2: Security Model (Release 1.01)", pp. 35, Feb. 6, 2009.
Renjie et al., "Research on OPC UA security", Industrial Electronics and Applications (ICIEA), 2010 the 5th IEEE Conference, IEEE, Piscataway, NJ, USA, pp. 1439-1444, Jun. 15, 2010.

* cited by examiner

*Primary Examiner* — Mohammad W Reza
(74) *Attorney, Agent, or Firm* — Fletcher Yoder, P.C.

(57) ABSTRACT

A system including a controller having a data repository configured to store a first mapping associating a user to an Application Certificate and a second mapping associating the user to a user privilege. The system further includes an OPC Unified Architecture (UA) server configured to provide server access based on receiving the Application Certificate from an OPC UA client and enforcing the user privilege, in which the user privilege is retrievable based on the first and the second mappings.

20 Claims, 6 Drawing Sheets

US 8,997,186 B2

SYSTEM AND METHOD FOR ENHANCED CONTROL SYSTEM SECURITY

BACKGROUND

The subject matter disclosed herein relates to systems and methods for enhanced security control systems.

Certain systems, such as industrial automation systems, may include capabilities that enable the control and monitoring of the system. For example, an industrial automation system may include controllers, field devices, and sensors monitoring data for subsequent analysis. Furthermore, such industrial control systems may include one or more devices that may be coupled to the controller and may communicate with other systems according to the Object Linking and Embedding (OLE) for Process Control (OPC) Unified Architecture (UA) protocol. OPC UA is a protocol for manufacturer-independent communication used in industrial automation systems (e.g., automated power generation systems and automated manufacturing systems) that is specified by the OPC Foundation. For example, an industrial automation system may include an OPC UA server that may generally store information regarding the operational parameters of the industrial automation system. Additionally, the OPC UA server may also make this information available, via a network connection, to one or more OPC clients operating at another location. It would be beneficial to improve control system security.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller having a data repository configured to store a first mapping associating a user to an Application Certificate and a second mapping associating the user to a user privilege. The system further includes an OPC Unified Architecture (UA) server configured to provide server access based on receiving the Application Certificate from an OPC UA client and enforcing the user privilege, in which the user privilege is retrievable based on the first and the second mappings.

In a second embodiment, a method includes creating a first map associating a user to an Application Certificate and a second map associating the user to a user privilege. The method also includes receiving the Application Certificate from an OPC Unified Architecture (UA) client. The method further includes restricting access to a controller based on retrieving a user privilege, in which retrieving the user privilege includes using the first and the second mappings.

In a third embodiment, a tangible, non-transitory, computer-readable medium stores a plurality of instructions executable by a processor of an electronic device, and the instructions include instructions to create a first map, which associates a user to an Application Certificate and a second map, which associates the user to a user privilege. The instructions also include instructions to receive the Application Certificate from an OPC Unified Architecture (UA) client. The instructions further include instructions to restrict access to a controller based a user privilege, in which the user privilege is determined by using the first and the second mappings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
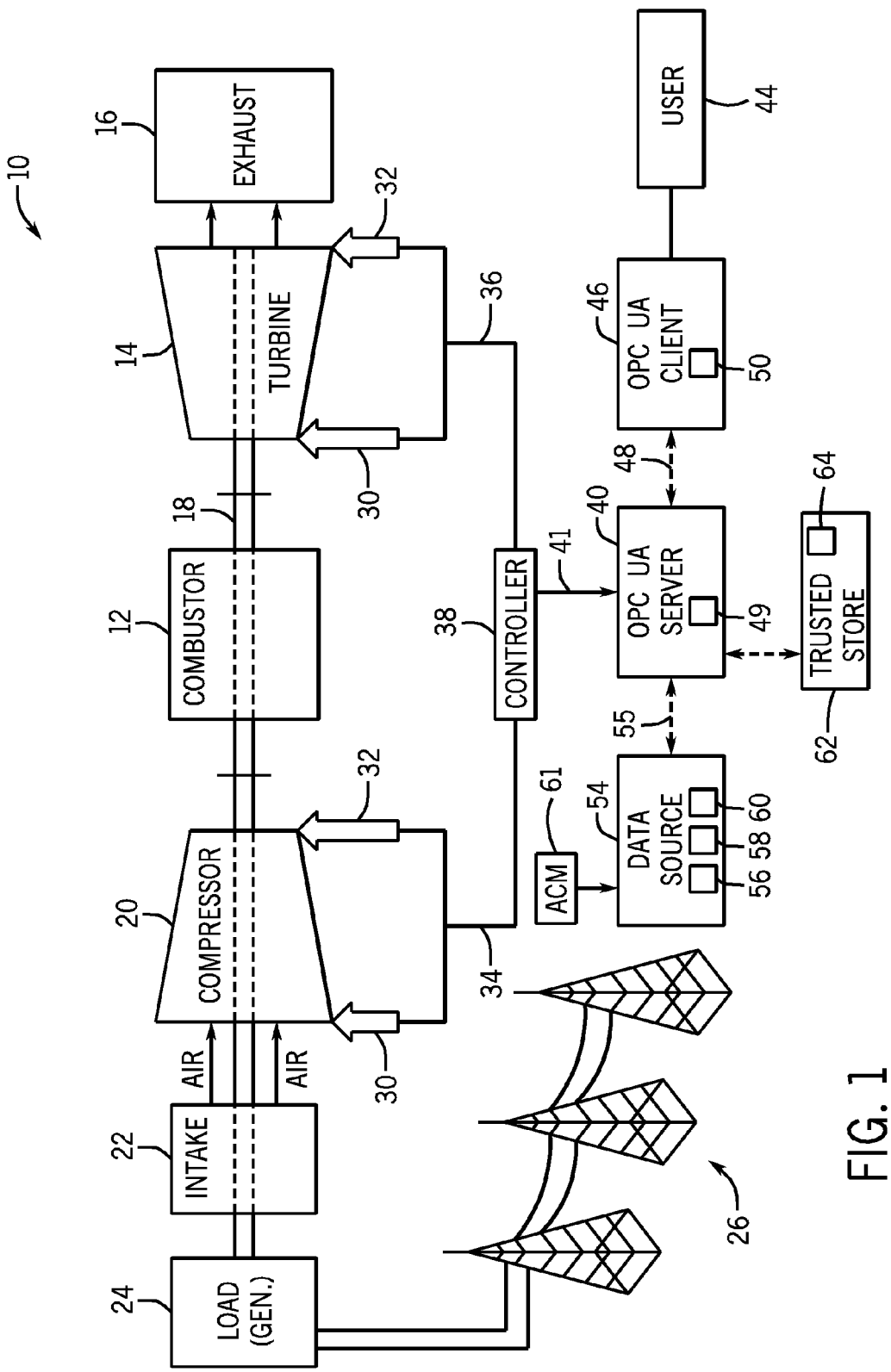
FIG. 1 is a block diagram of an embodiment of an industrial control system, including a controller, an OPC UA server, and an OPC UA client.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments described herein, the OPC UA protocol may be used in industrial automation or control systems, such as automated power generation systems (e.g., gas, steam, wind, or water turbines, heat recovery steam generators (HRSG), gasification systems, combustion systems, electrical power generators, or similar automated power generation systems) and automated manufacturing systems (e.g., chemical plants, oil refineries, or similar manufacturing system) to enable OPC UA servers and a user (human user and/or automated entity) using an OPC UA client to communicate with one another over a network. In order to provide for a desired security level and to improve control over the communications between an OPC UA server and the user, it may be beneficial for the OPC UA server to more efficiently identify the user and associated user information. For example, by more efficiently identifying the user, the OPC UA server may more rapidly associate users to user privileges, and take faster control actions based on the associations.

Accordingly, the presently disclosed embodiments may create and use multiple mappings between users on an OPC UA client, Application Certificates, user roles, and user privileges. For example, one mapping can associate a user to an Application Certificate and another mapping can associate a user to user privileges. By presenting the Application Certificate to a server, a client may be given all of the roles and privileges associated with the user(s) linked to the Application Certificate. Furthermore, the presently disclosed embodiments may not change or compromise the underlying client or server security OPC architecture. In other words, an OPC UA client that meets the specifications set out by the OPC Foundation may be used without recoding. An example of such a sample client is available from the OPC Foundation of Auburn Township, Ohio. Indeed, a substantial number of OPC clients may use the techniques disclosed therein without modifications.

With the foregoing in mind, it may be useful to describe an automation system incorporating the techniques disclosed herein. Accordingly, FIG. 1 illustrates a gas turbine system 10 as an example embodiment of an industrial automation system that incorporates the improved control security techniques disclosed herein. As depicted, the turbine system 10 may include a combustor 12, which may receive a fuel/air mixture for combustion. This combustion creates hot, pressurized exhaust gases, which the combustor 12 directs through a turbine 14 (e.g., part of a rotor) and toward an exhaust outlet 16. As the exhaust gases pass through the turbine 14, the resulting forces cause the turbine blades to rotate a drive shaft 18 along an axis of the turbine system 10. As illustrated, the drive shaft 18 is connected to various components of the turbine system 10, including a compressor 20.

The drive shaft 18 may include one or more shafts that may be, for example, concentrically aligned. The drive shaft 18 may include a shaft connecting the turbine 14 to the compressor 20 to form a rotor. The compressor 20 may include blades coupled to the drive shaft 18. Thus, rotation of turbine blades in the turbine 14 may cause the shaft connecting the turbine 14 to the compressor 20 to rotate the blades within the compressor 20. The rotation of blades in the compressor 20 compresses air that is received via an air intake 22. The compressed air is fed to the combustor 12 and mixed with fuel to allow for higher efficiency combustion. The shaft 18 may also be connected to a load 24, which may be a vehicle or a stationary load, such as an electrical generator in a power plant or a propeller on an aircraft. When the load 24 is an electrical generator, the electrical generator may be coupled to a power grid 26 for distributing electrical power to, for example, residential and commercial users.

The turbine system 10 may also include a plurality of sensors and field devices configured to monitor a plurality of engine parameters related to the operation and performance of the turbine system 10. The sensors and field devices may include, for example, inlet sensors and field devices 30 and outlet sensors and field devices 32 positioned adjacent to, for example, the inlet and outlet portions of the turbine 14, and the compressor 20, respectively. The inlet sensors and field devices 30 and outlet sensors and field devices 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 30 and 32 may also measure actuator information such as valve position, and a geometry position of variable geometry components (e.g., inlet guide vanes at an air inlet). The plurality of sensors and field devices 30 and 32 may also be configured to monitor engine parameters related to various operational phases of the turbine system 10. Measurements taken by the plurality of sensors and field devices 30 and 32 (i.e., operational parameters of the industrial automation system 10) may be transmitted via module lines 34 and 36, which may be communicatively coupled to a controller 38. The controller 38 may be a redundant controller, such as a Triple Modular Redundancy (TMR) controller. The redundant controller 38 includes a plurality of systems (e.g. 2, 3, 4, 5, or more) such as processing cores. For example, the TMR controller 38 has three systems (e.g., processing cores) performing a single task with the output determined by a voting of the three systems. For example, module line 34 may be utilized to transmit measurements from the compressor 20, while module line 36 may be utilized to transmit measurements from the turbine 14. The controller 38 may use the measurements to actively control the turbine system 10.

It should be appreciated that other sensors may be used, including combustor 12 sensors, exhaust 16 sensors, intake 22 sensors, clearance sensors, and load 24 sensors. Likewise, any type of field devices may be used, including "smart" field devices such as Fieldbus Foundation, Profibus, and/or Hart field devices. It is also to be appreciated that the gas turbine system 10 is only an example embodiment of an industrial automation system, and that other industrial automation systems may include, for example, automated power generation systems, such as gas turbines, steam turbines, wind turbines, or hydroturbines, heat recovery steam generators (HRSG), a power generator, fuel skids, gas processing systems, or any other automated power generation system or partially-automated power generation system. Other industrial automation systems may include automated manufacturing systems such as chemical plants, pharmaceutical plants, oil refineries, automated production lines or similar automated or partially-automated manufacturing system.

As mentioned above, the OPC UA server 40 may be communicatively coupled to the controller 38 such that it may request and/or receive data from the controller 38 regarding the operational parameters of the system 10. In certain embodiments, the OPC UA server 40 may be part of the controller 38 or may be coupled to the controller 38 via a network connection (e.g., an internal network connection 41). The operational parameters of the system 10 may include, for example, information regarding the status (e.g., functional, operational, malfunctioning, security, or similar status), the performance (e.g., the power output, revolutions per minute, load, or similar performance parameter), the environmental conditions (e.g., temperature, pressure, voltage, current, present or levels of a particular analyte, or similar environmental condition), and so forth, that may be generally tracked by the controller 38 for the industrial automation system, such as the gas turbine system 10.

While the disclosed OPC UA server embodiments allow for more control over communication between OPC UA server 40 and a user 44 using an OPC UA client, such as OPC UA client 46, the OPC UA client 46 may generally communicate (e.g., using an external network connection 48) with the disclosed OPC UA server 40 according to the standard protocols. For example, the OPC UA server 40 will send a server certificate 49 identifying the server 40 and the OPC UA client 46 will send an Application Certificate 50, identifying the user 44, to the OPC UA server 40. As described above, the OPC UA client 46 can be any standard OPC UA client, and as such, substantially most OPC certified clients may use the techniques described herein. For example, in one embodiment, the OPC UA 46 client may include ControlST™, available from General Electric Company, of Schenectady, N.Y. ControlST™ may include non-transient executable software or computer instructions stored in a machine readable medium and used for commissioning, programming, configuring I/O, trending, and analyzing diagnostics of, for example, the controller 38. The software may provide a source of improved quality, time-coherent data at the controller 38 and plant level for more effectively controlling and/or managing equipment assets.

In general, data store 54 may be any type of data repository. For example, the data store 54 may be a database or other type of data server. Additionally, in certain embodiments, the data store 54 may be part of the controller 38. The data store 54 may reside on-site and be communicatively coupled to the OPC UA server 40 (e.g., via connection 55, which may be an internal bus or an internal network connect), or may be off-site and coupled to the OPC UA server 40 via an external network connection. In other embodiments, the data store 54 may reside on the same electrical device (e.g., computer, server, or similar processing or computing device) as the OPC UA server 40 and the communication may instead involve a local connection (e.g., local loop-back, common files or memory spaces, etc.).

The illustrated data store 54 may store the above mentioned mappings between users, Application Certificates, user roles, and user privileges, and any other data associated with a user. The user may include a human user, an automated entity (e.g., software and/or hardware entity), or a combination thereof. In one embodiment, a first mapping 56 associates users to Application Certificates. A second mapping 58 associates users to user privileges. It should be appreciated that, in other embodiments, a third mapping 60 associates users to at least one user role (e.g., system administrator role, commissioning engineer role, basic user role). The mappings described above may be created in the Application Certificate Management (ACM) system 61 and communicatively coupled to the data store 54. In some embodiments, the ACM 61 may be an application that allows a system administrator to create the associations either manually or automatically. It may be helpful if the application includes a graphical user interface (GUI) to visualize as well as edit the mappings 56, 58, 60, as further depicted below. The mappings can be predetermined and created on any computing machine able to run the application. The mappings 56, 58, 60 may be transferred to the data store 54 via a network connection or by using a portable storage device (e.g., thumb drive, DVD). Thus, is should be appreciated that the ACM can reside either on-site or off-site. In an alternate embodiment, the ACM 61 may reside on the same computing device (e.g., workstation, laptop, tablet, cell phone) as the data store 54 and involve a local connection.

A Trusted Store 62 may store a trusted list 64 of Application Certificates that are used to access the OPC UA server 40. In one embodiment, the Trusted Store 62 is a standard Microsoft Windows® certificate store with an OPC UA overlay or layer providing OPC UA functionality. Using the certificate store may then enable for easy editing of the trusted list 64 by, for example, a system administrator. Furthermore, these techniques provide for the use of a common standard, e.g., Microsoft Windows® certificate store, in conjunction with the OPC UA server 40 and OPC UA client 46. Any other common certificate store standard may be used with the disclosed embodiments. The Trusted Store 62 is communicatively coupled to the OPC UA server 40. In certain embodiments, the Trusted Store 62 may reside on-site and communicate with the OPC UA server 40 via, for example, an internal network connection or may be off-site and coupled to the OPC UA server 40 via an external network connection. In these embodiments, it should be appreciated that the Trusted Store 62 may be used on a computing machine able to access any Microsoft Windows® certificate store. In other embodiments, the Trusted Store 62 may reside on the same computing device (e.g., computer, server, laptop, tablet, cell phone, mobile device, or similar processing or computing device) as the OPC UA server 40 and the communication may instead involve a local connection (e.g., local area network [LAN]). The communications may be used to exchange certificates 49, 50 and derive, for example, user 44 privileges and roles, as described in more detail with respect to FIG. 2 below.

Figure 2:
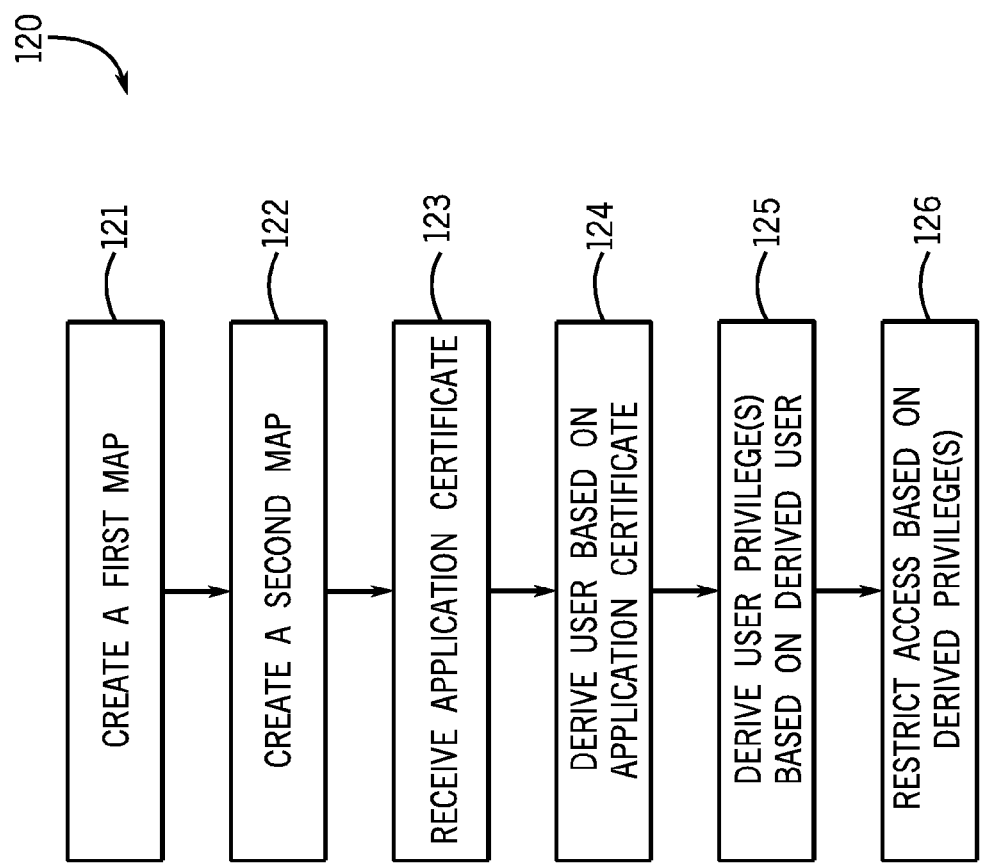
FIG. 2 is flowchart illustrating an embodiment of a process by which access is restricted to the OPC UA server shown in FIG. 1.

FIG. 2 is a flow chart illustrating an embodiment of a process 120 by which the OPC UA server 40 may restrict access, according to the presently disclosed embodiments. The process 120 may be included in executable non-transitory computer instructions or code stored in a machine readable medium, such as a memory of the controller 38, the server 40, the client 46, the data store 54, or a combination thereof. The process 120 may begin with the ACM 61 creating (block 121) the first mapping 56. As described above, the first mapping 56 associates or links one or more users 44 to one or more Application Certificates 50. Next, the ACM 61 creates (block 122) the second mapping 58. As described above, the second map 58 associates one or more users 44 with one or more user privileges. The user privileges include the ability to read, write, update, make other method calls, or more generally, access the OPC UA server 40. It should be appreciated that the user privileges may correspond to method calls that may be made to the system 10 such as a power generation system or an automated manufacturing system. Once the maps 56, 58 are created, the OPC UA server 40 receives (block 123) the Application Certificate 50 from an OPC UA client, such as the OPC UA client 46. Using the Application Certificate 50 and the first mapping 56, the OPC UA server 40 derives (block 124) the user 44 on the OPC UA client 46. That is, the first mapping 56 enables the server 40 to use the received Application Certificate 50 and to derive the identity of the associated user(s). Accordingly, time that would have been spent entering additional user credentials, (e.g., user name, password) may be minimized or eliminated. After the user 44 is derived, the OPC UA server 40 derives (block 125) the user privileges using the derived user 44 and the second mapping 58. The second mapping 58 enables the server 40 to use the derived user 44 and to derive the user privileges associated with the user 44. Thus, the OPC UA server 40 is able to restrict access (block 126) to the client 46 based on the derived user privileges. For example, if the client 46 attempts to write to the server 40, the server 40 may then check the derived user privileges to determine whether or not the client 46 has been provided the write privilege. Because the server 40 may be communicatively coupled to or included in the controller 38, the derived privileges may be used to restrict access to the controller 38. Accordingly, control actions provided by the controller 38 may be restricted based on the transmitted certificate 50 and derived user privileges and/or roles. In this manner, the mappings 56, 58 may enable a more efficient controller 38 security system.

Figure 3:
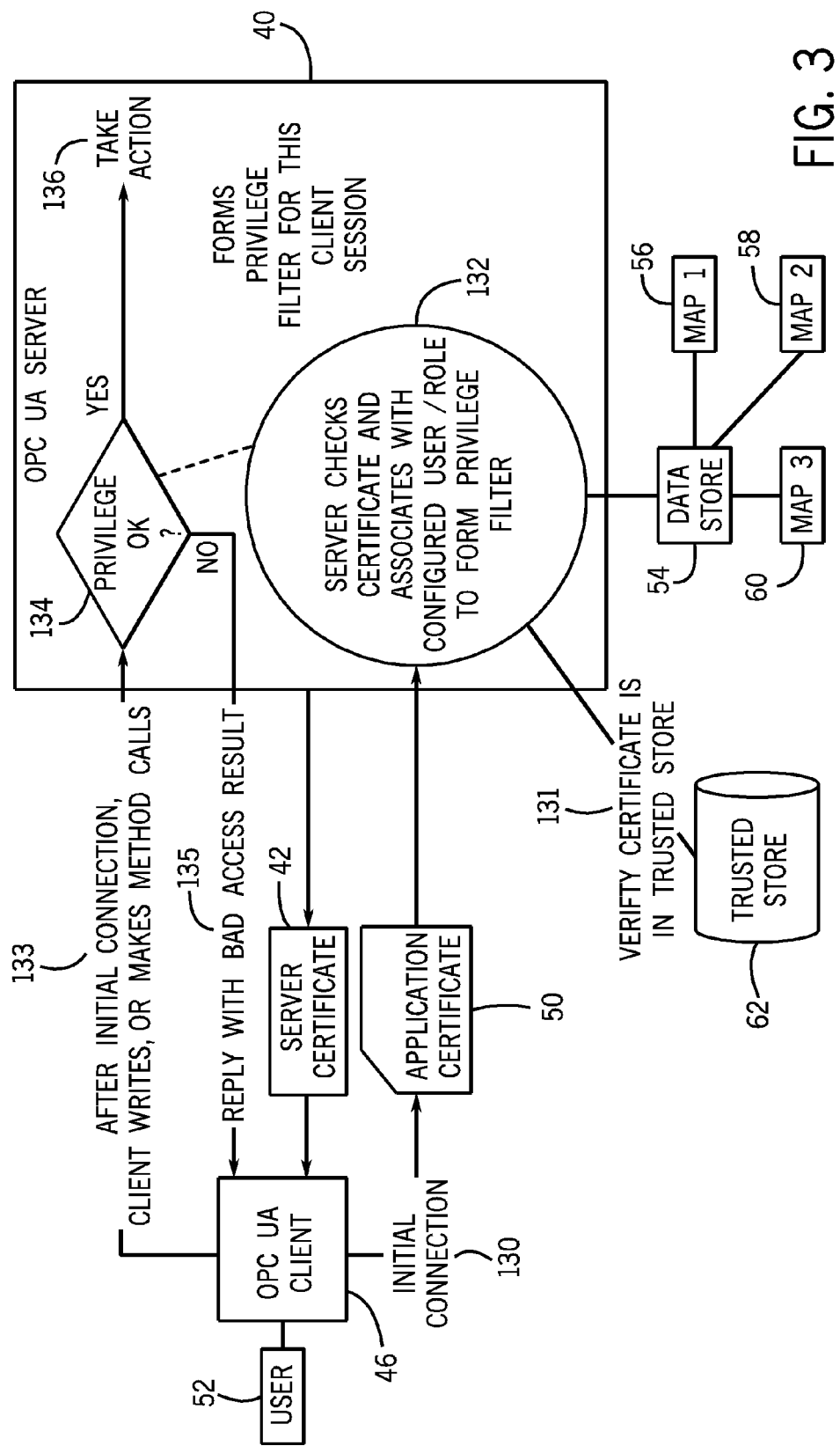
FIG. 3 is an information flow diagram illustrating an embodiment of communications between an OPC UA client and the OPC UA server shown in FIG. 1.

FIG. 3 is an information flow diagram that illustrates an embodiment of communications between the OPC UA client 46 and the OPC UA server 40 in accordance with the process 120 described in FIG. 2. The communication between the OPC UA client 46 and OPC UA server 40 may be using any standard security protocol such as Transport Layer Security (TLS) or Secure Sockets Layer (SSL). For example, in one embodiment, after an initial connection 130 between the OPC UA server 40 and the OPC UA client 46, the OPC UA server 40 will send the server certificate 49 to the OPC UA client 46 so that the OPC UA client 46 can verify that it is communicating with the desired server 40. Once the OPC UA client 46 is sure it is communicating with the desired server 40, the OPC UA client 46 will send an Application Certificate 50 to the OPC UA server 40 to identify the user 44 using or associated with the OPC UA client 46. One type of Application Certificate 50 that may be used is an X.509 certificate. The X.509 certificate standard cryptographically binds the certificate holder with its public key. The X.509 certificate includes a data section (i.e. the version number, the certificate's serial number, algorithm, identify of issuer, valid period, and identity of subject) and a signature section. Other certificate types may include Extended Validation (EV) SSL Certificates, Organization Validation (OV) SSL Certificates, and Domain Validation (DV) SSL Certificates.

After receiving the Application Certificate 50, the OPC UA server 40 verifies (communication arrow 131) that the Application Certificate 50 is found in the Trusted Store 62 to ensure that that the OPC UA client 46 is allowed to communicate with the OPC UA server 40. Next, the Application Certificate 50 is sent to the data store 54 to determine (derivation 132) the user privileges for the user on the OPC UA client 46. As described above, the data store 54 may employ the first mapping 56, associating Application Certificates 50 to users 44, and the second mapping 58 associating users 44 to user privileges and/or roles. It should be appreciated, that the data store 54 may employ the third mapping 60 associating user roles to user privileges. Other mappings may be used in addition to or alternative to the mappings 56, 58, 60, including mappings between users and user roles, users and controller actions, users and hardware, users and applications, and so forth. Accordingly, user access may be found by deriving controller actions, hardware, and/or software applications that the user may be authorized to use. Once the user privileges and/or roles are derived (derivation 132), a privilege filter 134 is created in the OPC UA server 40. Thus, each time the user 44 on the OPC UA client 46 attempts to make a method call 133 or otherwise access the OPC UA server 40, the OPC UA server 40 will check to see the whether the client 46 has the appropriate user privilege and/or role. If the OPC UA server 40 determines that the client 46 does not have the appropriate user privilege and/or role, it may reply with an incorrect access result 135. On the other hand, if the client 46 does have the appropriate privilege and/or role, the OPC UA server 40 may take the requested action 136.

Prior to the techniques herein, the OPC UA server 40 and the OPC UA client 46 may have communicated through complex and numerous steps. Comparatively, the techniques herein may simplify the communications between the OPC UA server 40 and the OPC UA client 46 by creating and using the privilege filter 134. Accordingly, the security of communications between the OPC UA server 40 and OPC UA client 46 may be improved with the increased control over the communications. For example, the OPC UA server 40 may be able to associate a user 52 to a user certificate 50. The screen view of graphical user interface (GUI) of an embodiment of an application that may be used to implement the techniques herein is shown in FIG. 4-6.

Figure 4:
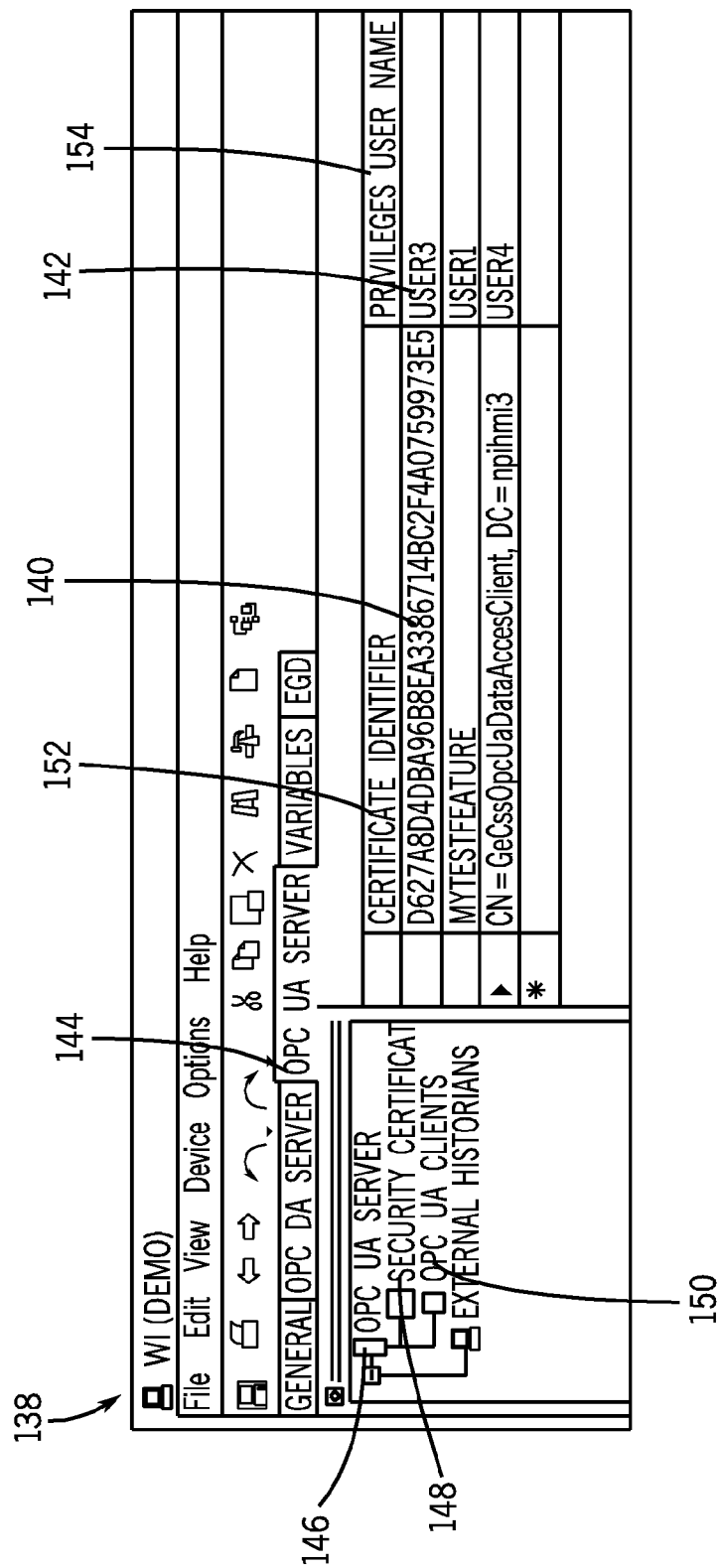
FIG. 4 is an embodiment of a screen view illustrating multiple users and associated certificates.

FIG. 4 is an embodiment of a screen view 138, GUI, of an application that implements the first mapping 56, created by the ACM 61, by associating a user cell 142 with a certificate identifier cell 140. The screen view 138 may be implemented by using computer instructions stored in a non-transitory computer-readable medium, such as the memory of a computer, server, laptop, tablet, cell phone, mobile device, or similar processing or computing device. In the depicted embodiment, the screen view 138 may be displayed by first selecting an OPC UA Server tab 144. As can be seen in the screen view 138, other tabs that may be selected include General, OPC DA Server, Variables, and EGD. Once the OPC UA Server tab 144 is chosen, an OPC UA tree control 146 may be used to navigate between a Security Certificates node 148, screen view 138, and OPC UA Clients node 150, which displays a list of OPC UA Clients. When the Security Certificates node 148 is chosen, a Certificate Identifier list or column 152 and a Privileges User Name list or column 154 may be displayed on a device running the application such as a computer. To implement the first mapping 56, each user from the Privileges User Name list 154, such as the depicted "user 3" 142, may be associated with a certificate identifier, such as "D627A8D4DBA96B8EA3386714BC2F4A0759973E59" 140, from the Certificate Identifier list 152. It should be appreciated, that the users in the Privileges User name list 154 may be visually associated with the certificate identifiers in the Certificate Identifier list 152. As described above, the ACM 61 may have the ability to add, change, or remove the association (e.g., mappings 56) between entries in the Privileges User list 154 and entries in the Certificate Identifier list 152. The application that may be used to implement this may be seen in FIG. 5.

Figure 5:
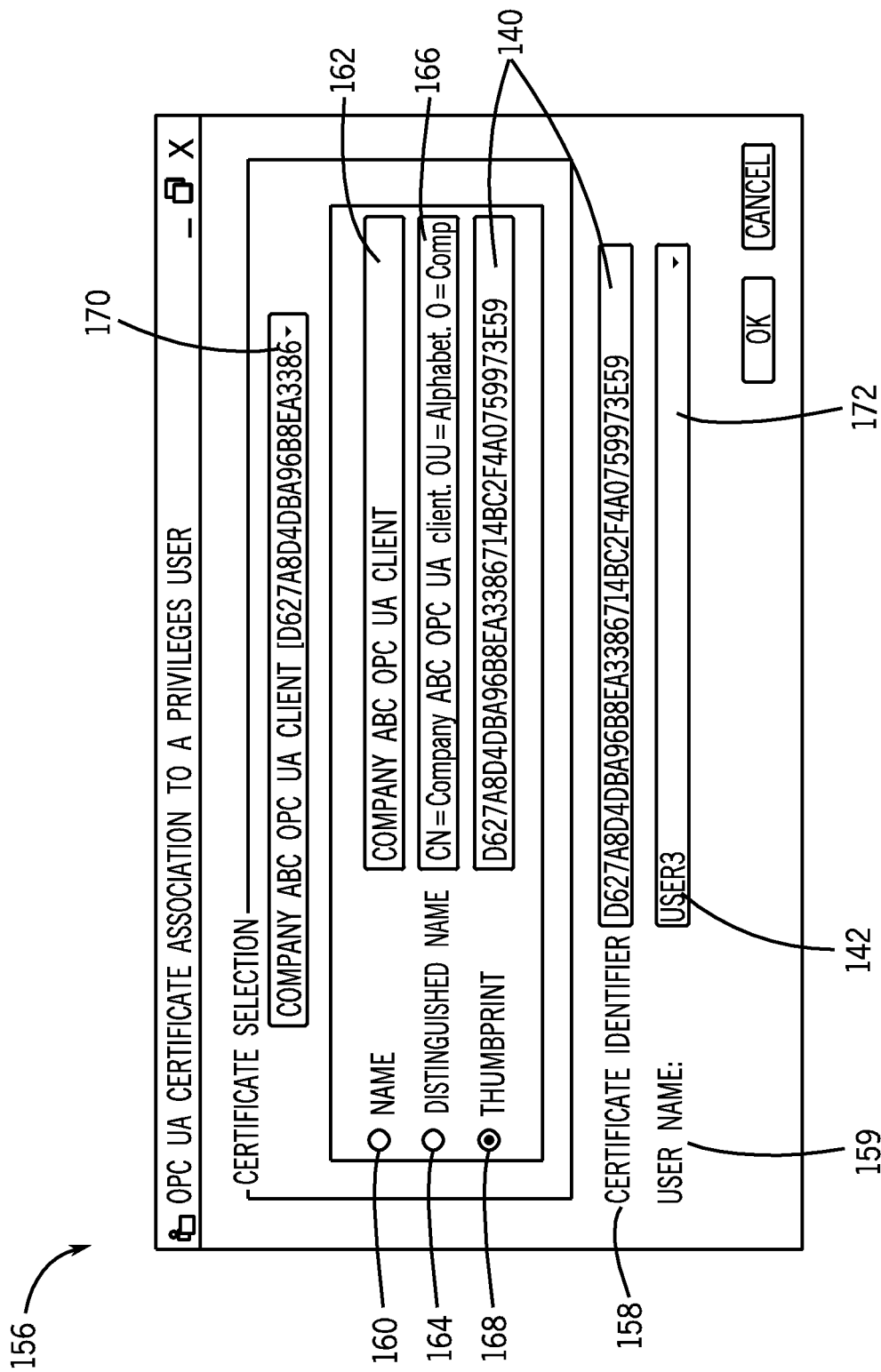
FIG. 5 is an embodiment of a screen view illustrating the selection of a class of certificate and a user name.
Figure 6:
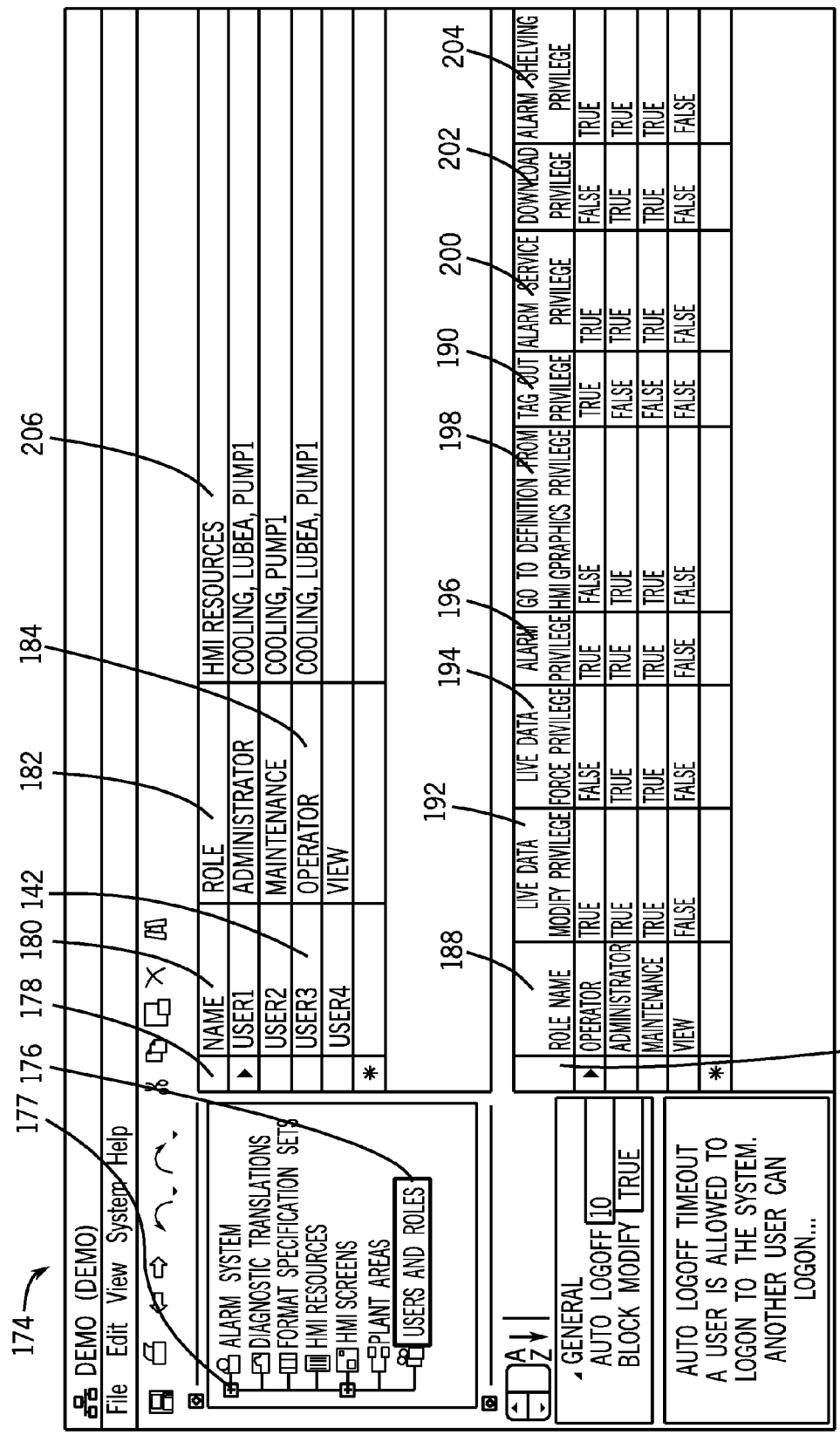
FIG. 6 is an embodiment of a screen view illustrating multiple users and associated privileges.

FIG. 5 is an embodiment of a screen view 156, GUI, of a dialog box illustrating the selection of a certificate identifier 158 and an associated user name 159. To illustrate, editing entries will be discussed in the context of the user 44 labeled "user3" 142 and the associated certificate identifier 140 labeled "D627A8D4DBA96B8EA3386714BC2F4A0759973E59 140." The Screen view 156 may be implemented by using computer instructions stored in a non-transitory computer-readable medium, such as the memory of a computer, server, laptop, tablet, cell phone, mobile device, or similar processing or computing device. To determine which entry is being edited, a client 46 security certificate may be chosen from a drop down menu 170. In screen view 156, the chosen client 46 is labeled "Company ABC OPC UA client." Once the client 46 security certificate is chosen, there may be certain items that may be associated with the certificate identifier 158. A first item may include the client's name 160. An example of the client's name 160 is labeled "Company ABC OPC UA client" 162. Another item may include a distinguished name (DN) 164. The DN 164 is a unique identifier known in the X.509 certificate standard. In the illustrated example, the DN 164 is labeled "CN=Company ABC OPC UA client, OU=Alphabet, O=Company ABC, L=Letterville, S=NY, C=US 166." The third item may include a unique thumbprint 168, consisting of a random string of characters. In the depicted example, the unique thumbprint 168 is labeled "D627A8D4DBA96B8EA3386714BC2F4A0759973E59 140." As can be appreciated, each item may provide a different level of security. For example, the unique thumbprint 168 may be more secure than the name 160. In screen view 156, the unique thumbprint 168 option is chosen. Thus, certificate identifier 158 is set to use D627A8D4DBA96B8EA3386714BC2F4A0759973E59 140. Other items may be used, including biometric items, security tokens, challenge-response keys, and so on.

After the certificate identifier 158 is selected, a corresponding user name 159 may be selected from drop down menu 172. In screen view 156, the user name 159 chosen is labeled "user 3" 142. In relation to FIG. 4, the association chosen in screen view 156 between certificate identifier 158 and user name 159 is displayed in screen view 138. Because it is possible to identify the user name 159 based on the received certificate identifier 158, the next step may be, as shown in FIG. 6, to associate the user name 159 to user privileges and/or roles.

FIG. 6 is an embodiment of a screen view 174, GUI, of an application that may implement the second mapping 58 by associating the user 142 to user privileges and/or roles. Again to illustrate, associating user privileges and/or roles will be discussed in the context of the user 44 labeled "user3" 142. The screen view 174 may be implemented by using computer instructions stored in a non-transitory computer-readable medium, such as the memory of a computer, server, laptop, tablet, cell phone, mobile device, or similar processing or computing device. In the depicted embodiment, the screen view 174 may be displayed by selecting a Users and Roles node 176 from tree view list 177. Other node options may include Alarm System, Diagnostic Translations, Format Specification Sets, HMI Resources, HMI Screens, and Plant Areas.

Screen view 174 may use two separate tables 178 and 186 to associate user 142 to user privileges and/or roles. The first table 178 may associate a list or column of user names 180 to a list or column of roles 182. For example, user 142 is associated with the role of operator 184. Other roles that may be associated with a user include Administrator, Maintenance, and View. The second table 186 may then associate a list of roles 188 with user privileges 190, 192, 194, 196, 198, 200, 202, 204. The user privileges 190, 192, 194, 196, 198, 200, 202, 204 may be used to enable access to certain method calls and other actions that may be made within the control system. As in screen view 174, each user privilege may be a separate column. For example, one user privilege is the Tag Out Privilege 190. In the Tag Out Privilege 190 column, each user role that is able to "Tag Out" may have a True and each user that is not able to "Tag Out" may have a False. In the embodiment depicted in screen view 174, the operator 188 user role is able to "Tag Out." Thus, user 3 142, will be able to "Tag Out," because user 3 142 is associated with the role of operator 188. Other user privileges may include Live Data Modify Privilege 192, Live Data Force Privilege 194, Alarm Privilege 196, Go To Definition From HMI Graphic Privilege 198, Alarm Service Privilege 200, Download Privilege 202, and Alarm Shelving Privilege 204. It should be appreciated that the users in the list of user names 180 may be visually associated with user privileges 190, 192, 194, 196, 198, 200, 202, 204. In addition, it should also be appreciated that a single table mapping between the user 142 and the user privileges maybe used by the OPC UA Server 40. Furthermore, it can be appreciated that the user 142 may be assigned multiple roles, hardware access, software access, control action access, and so on.

In addition, the first table 178 may associate the list 180 of user names to a list of human-machine interface (HMI) resources 206. In the embodiment depicted in screen view 174, user 142 is associated with HMI resources labeled "Cooling, LubeA and Pump1." The HMI resources listed may include items that the user 142 has access to in the control system 10. For example, user 3 142 may be able to access to the control system at Pump1.

Technical effects of the disclosed embodiments include enabling the OPC UA server 40 to improve the security of the communications between the OPC UA server 40 and the OPC UA client 46. In particular, the OPC UA server 40 may be able to more efficiently identify the user 52 on the OPC UA client 46 and associate the user 52 to user privileges, which allow the user 52 to make method calls. In other words, the OPC UA server 40 is able to determine who is on the OPC UA client 46 and what they are able to do within the control system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a controller configured to control a turbine system;
    a data repository configured to store a first mapping data structure that associates an application certificate to a user identity and to store a second mapping data structure that associates the user identity to a user privilege; and
    an Object Linking and Embedding for Process Control (OPC) Unified Architecture (UA) server communicatively coupled to the controller, wherein the OPC UA server is configured to:
        receive the application certificate from an OPC UA client;
        determine the user identity of the OPC UA client using the first mapping data structure;
        determine the user privilege granted the OPC UA client using the second mapping data structure; and
        provide the OPC UA client access to the controller based on the user privilege to enable the OPC UA client to instruct the controller to perform control actions on the turbine system.

2. The system of claim 1, wherein the OPC UA server is configured to input the application certificate into the first mapping data structure to determine the user identity of the OPC UA client and to input the user identity of the OPC UA client into the second mapping data structure to determine the user privilege granted the OPC UA client.

3. The system of claim 1, wherein the application certificate is a certificate object.

4. The system of claim 1, wherein the OPC UA server is configured to transmit a server certificate to the OPC UA client, and the OPC UA client is configured to authenticate the OPC UA server by using the server certificate.

5. The system of claim 1, comprising a trusted store, wherein the OPC UA server is configured to authenticate the OPC UA client by using the application certificate and the trusted store.

6. The system of claim 5, wherein the Trusted Store comprises a certificate store with an OPC UA overlay.

7. The system of claim 1, comprising an application certificate mapping (ACM) system configured to create the first and the second mappings.

8. The system of claim 7, wherein the ACM system comprises a user-to-application certificate mapping screen configured create the first mapping by visually associating the user identity to the application certificate.

9. The system of claim 7, wherein the ACM system comprises a user-to-user privilege mapping screen configured create the second mapping by visually associating the user identity to the user privilege.

10. The system of claim 1, wherein the controller is a triple modular redundancy (TMR) controller.

11. The system of claim 10, wherein the turbine system comprises a gas turbine system a steam turbine system, a wind turbine system, a water turbine system, or any combination thereof.

12. A method comprising:
   creating, using an application certificate management system, a first mapping data structure configured to associate an application certificate to a user identity;
   creating, using the application certificate management system, a second mapping data structure configured to associate the user identity to a user privilege;
   receiving the application certificate from an Object Linking and Embedding for Process Control (OPC) Unified Architecture (UA) client at an OPC UA server in a turbine system;
   verifying, using the OPC UA server, that the application certificate is stored in a trusted store;
   when the application certificate is stored in the trusted store:
      determining, using the OPC UA server, the user identity of the OPC UA client using the first mapping data structure;
      determining, using the OPC UA server, the user privilege granted the OPC UA client using the second mapping data structure; and
      enabling, using the OPC UA server, the OPC UA client to perform control actions in the turbine system by providing access to a controller configured to control the turbine system based on the user privilege.

13. The method of claim 12, wherein determining the user identify of the OPC UA client comprises inputting the application certificate into the first mapping data structure, and determining the user privilege granted the OPC UA client comprises inputting the user identity into the second mapping data structure.

14. The method of claim 12, wherein the user privilege corresponds to a method call made to the turbine system by the OPC UA client.

15. The method of claim 12, comprising displaying a visual representation of the first mapping data structure and a visual representation of the second mapping data structure on a graphical user interface (GUI).

16. The method of claim 12, wherein the application certificate is a certificate object.

17. A tangible, non-transitory, computer-readable medium storing a plurality of instructions executable by a processor of a turbine system, the instructions comprising instructions to:
   create a first mapping data structure, wherein the first map is configured to associate a user identity to an application certificate;
   create a second mapping data structure, wherein the second map is configured to associate the user identity to a user privilege;
   receive the application certificate from an Object Linking and Embedding for Process Control (OPC) Unified Architecture (UA) client requesting access to the turbine system;
   determine the user identity of the OPC UA client using the first mapping data structure;
   determine the user privilege granted the OPC UA client using the second mapping data structure; and
   enable the OPC UA client to perform control actions in the turbine system via a controller configured to control the turbine system, wherein the OPC UA client is provided access to the controller based on the user privilege granted the OPC UA client.

18. The medium of claim 17, wherein the user privilege is included in at least one user role associated with the OPC UA client.

19. The medium of claim 17, comprising instructions to display a visual representation of the first mapping data structure and a visual representation of the second mapping data structure on a graphical user interface (GUI).

20. The medium of claim 17, wherein the application certificate is a certificate object.

* * * * *